Patented Apr. 27, 1954

2,676,880

UNITED STATES PATENT OFFICE 2,676,880

HERBICIDAL COMPOSITIONS

Arthur H. Schlesinger, Dayton, Ohio, assignor to Monsanto Chemical Company, St. Louis, Mo., a corporation of Delaware No Drawing. Application January 19, 1953, Serial No. 332,077

5 Claims. (Cl. 71—2.3)

The present invention provides new and valuable compositions possessing highly selective herbicidal efficacy and methods of destroying or preventing plant growth in which such compositions are used.

I have found that improved, very efficient, selective herbicidal compositions are obtained when there are prepared oil-in-water emulsions of a β-chloroethyl ether having the formula

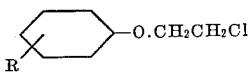

in which R is selected from the class consisting of hydrogen, chlorine and the methyl and ethyl radicals. β-Chloroethyl ethers useful for the present purpose include phenyl β-chloroethyl ether, 2-, 3-, or 4-tolyl β-chloroethyl ether and 2-, 3-, or 4-ethyl phenyl β-chloroethyl ether, 2-, 3-, 4-chlorophenyl β-chloroethyl ether, etc.

The present compositions are characterized by a high degree of selective efficacy in that even in very low concentrations, e. g., in a concentration of as low as 0.3 per cent, they severely injure narrow-leafed plant growth but have no adverse effect on broad-leafed plants at the same or higher concentrations. They may thus be employed very advantageously for ridding truck crop fields, e. g., strawberries, beans, etc., of invading grasses.

Herbicidal compositions containing the present β-chloroethyl ethers are readily obtained by first preparing a solution thereof in an organic solvent and then adding the resulting solution to water containing an emulsifying agent to form an emulsion. Because of the very high herbicidal efficiency of the ethers, they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. Examples of emulsifying agents which may be used include alkylbenzenesulfonates, long chained polyalkylene glycols, long chained succinates, etc. The emulsions may be used to destroy already existing plant growth by direct application to the undesirable plants, e. g., by spraying, or the emulsions may be employed to prevent plant growth by application to media which normally support plant growth.

The present invention is further illustrated, but not limited, by the following example:

*Example*

Spray testing of the present herbicidal compositions was conducted as follows:

Respective cyclohexanone solutions of β-chloroethyl phenyl ether and some related compounds were added to water, the quantity of solution employed being calculated to give emulsions containing 1.0 per cent and 0.3 per cent by weight, respectively, of the compound to be tested, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. The following observations were made:

| Compound Tested | Extent of injury* on— | |
|---|---|---|
| | Bean | Corn |
| β-chloroethyl phenyl ether: | | |
| 0.3% | 0 | 3 |
| 1.0% | 0 | 4, 4a |
| Bis (β-chloroethyl) fumarate: | | |
| 0.3% | 0 | 0 |
| 1.0% | 0 | 0 |
| Ethyl 2, 4, 4, 4-tetrachlorobutyl ether: | | |
| 0.3% | 0 | 0 |
| 1.0% | 0 | 0 |
| Dicyanoethyl ether: | | |
| 0.3% | 0 | 0 |
| 1.0% | 1 | 0 |

*4=plant dead; 4a=leaves dried; 3=severe injury; 1=slight injury; 0=no effect.

The high activity of β-chloroethyl phenyl ether against corn is remarkable for, as shown above, neither ethers, generally nor β-chloroethyl compounds, generally, possess this property.

While the present ethers are most advantageously employed as herbicides by incorporating them into an aqueous emulsion as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. The present β-chloroethyl ethers may also be mixed with liquid or solid agricultural pesticides, e. g., insecticides and fungicides. While solutions of the ethers in organic solvents may be employed for preventing and destroying plant growth, I have found that the emulsions possess an improved tendency to adhere to the treated surfaces and that less of the active ingredients is required to give comparable herbicidal efficiency.

What I claim is:

1. A herbicidal composition comprising an oil-in-water emulsion of β-chloroethyl ether having the formula

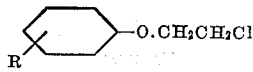

in which R is selected from the class consisting of hydrogen, chlorine, and the methyl and ethyl radicals.

2. A herbicidal composition comprising an oil-in-water emulsion of β-chloroethyl phenyl ether.

3. The method of destroying undesired plants which comprises applying to said plants a toxic quantity of a herbicidal composition containing, as the essential active ingredient, a β-chloroethyl ether having the formula

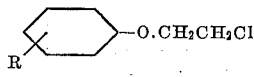

in which R is selected from the class consisting of hydrogen, chlorine, and the methyl and ethyl radicals.

4. The method of destroying undesired plants which comprises applying to said plants a toxic quantity of an oil-in-water emulsion of a β-chloroethyl ether having the formula

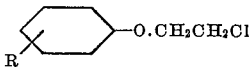

in which R is selected from the class consisting of hydrogen, chlorine, and the methyl and ethyl radicals.

5. The method of destroying undesired plants which comprises applying to said plants a toxic quantity of an oil-in-water emulsion of β-chloroethyl phenyl ether.

No references cited.